United States Patent
Kuscu et al.

(10) Patent No.: US 10,556,531 B2
(45) Date of Patent: Feb. 11, 2020

(54) HEADREST ASSEMBLY FOR A VEHICLE

(71) Applicant: Lear Corporation, Southfield, MI (US)

(72) Inventors: Erdal Kuscu, Sindelfingen (DE);
Guenther Gabsa, Tuebingen (DE);
Roland Traub, Schoenaich (DE)

(73) Assignee: LEAR CORPORATION, Southfield, MI (US)

( * ) Notice: Subject to any disclaimer, the term of this patent is extended or adjusted under 35 U.S.C. 154(b) by 23 days.

(21) Appl. No.: 15/928,026

(22) Filed: Mar. 21, 2018

(65) Prior Publication Data

US 2018/0354396 A1    Dec. 13, 2018

(30) Foreign Application Priority Data

Jun. 7, 2017    (DE) .......................... 10 2017 209 583

(51) Int. Cl.
| | |
|---|---|
| *B60N 2/803* | (2018.01) |
| *B60N 2/20* | (2006.01) |
| *B60N 2/22* | (2006.01) |
| *B60N 2/80* | (2018.01) |

(52) U.S. Cl.
CPC .............. *B60N 2/803* (2018.02); *B60N 2/20* (2013.01); *B60N 2/2245* (2013.01); *B60N 2002/899* (2018.02)

(58) Field of Classification Search
CPC ........ B60N 2/803; B60N 2/20; B60N 2/2245; B60N 2002/899
See application file for complete search history.

(56) References Cited

U.S. PATENT DOCUMENTS

| | | | |
|---|---|---|---|
| 3,170,725 | A | 2/1965 | Komorowski |
| 4,191,417 | A | 3/1980 | Ferrara |
| 4,725,076 | A | 2/1988 | Taylor |
| 5,056,816 | A | 10/1991 | Lutze et al. |
| 5,397,170 | A | 3/1995 | Shrock |
| 5,934,749 | A | 8/1999 | Pond et al. |

(Continued)

FOREIGN PATENT DOCUMENTS

| | | |
|---|---|---|
| DE | 37 23 682 C2 | 12/1990 |
| DE | 39 35 630 C2 | 3/2002 |

(Continued)

OTHER PUBLICATIONS

DE 10 2005 043 084 A1, Abstract & Machine Translation.
(Continued)

*Primary Examiner* — D Glenn Dayoan
*Assistant Examiner* — Melissa Ann Bonifazi
(74) *Attorney, Agent, or Firm* — Brooks Kushman P.C.

(57) ABSTRACT

A multi-headrest assembly for a vehicle includes first and second headrests for first and second seats of the vehicle, respectively, and a multi-headrest mount having a crossbar and first and second brackets coupled to and spaced along the crossbar for supporting the first and second headrests, respectively. The crossbar has a length for defining a space between the first and second headrests for aligning the first and second headrests with the first and second seats, respectively, when mounted in the vehicle. The multi-headrest assembly further includes first and second seatback portions configured to be coupled to and supported by the first and second brackets, respectively.

20 Claims, 5 Drawing Sheets

(56) References Cited

U.S. PATENT DOCUMENTS

| | | | |
|---|---|---|---|
| 6,076,880 A * | 6/2000 | Coffer | B60N 2/3011 296/65.01 |
| 6,398,291 B1 | 6/2002 | Reusswig et al. | |
| 6,981,731 B2 | 1/2006 | Welch et al. | |
| 7,478,874 B2 | 1/2009 | Figenser et al. | |
| 2004/0090056 A1 | 5/2004 | Sung | |
| 2010/0109415 A1 | 5/2010 | Roszczenko et al. | |
| 2016/0297337 A1 | 10/2016 | White et al. | |

FOREIGN PATENT DOCUMENTS

| | | |
|---|---|---|
| DE | 10 2005 043 084 A1 | 3/2007 |
| DE | 10 2006 036 935 A1 | 10/2007 |
| EP | 1 289 794 B1 | 8/2005 |

OTHER PUBLICATIONS

DE 10 2006 036 935 A1, Abstract & Machine Translation.
EP 1289 794 B1, Abstract & Machine Translation of Corresponding Document WO/0189875 A1.
German Office Action dated Jun. 18, 2018, Application No. 10 2017 209 583.0, Applicant Lear Corporation, 6 Pages.
DE 37 23 682 C2, Abstract & Machine Translation.
DE 39 35 630 C2, Abstract & Machine Translation.

\* cited by examiner

HEADREST ASSEMBLY FOR A VEHICLE

CROSS-REFERENCE TO RELATED APPLICATIONS

This application claims foreign priority benefits under 35 U.S.C. § 119(a)-(d) to DE 10 2017 209 583.0, filed Jun. 7, 2017, the disclosure of which is hereby incorporated by reference in its entirety.

TECHNICAL FIELD

The various embodiments relate to vehicles and vehicle seats with headrest assemblies.

BACKGROUND

Vehicles may include seats with headrest assemblies. Vehicles may also include seats with seatbacks that are pivotable.

SUMMARY

According to at least one embodiment, a multi-headrest assembly for a vehicle includes first and second headrests for first and second seats of the vehicle, respectively, and a multi-headrest mount having a crossbar and first and second brackets coupled to and spaced along the crossbar for supporting the first and second headrests, respectively. The crossbar has a length for defining a space between the first and second headrests for aligning the first and second headrests with the first and second seats, respectively, when mounted in the vehicle. The multi-headrest assembly further includes first and second seatback portions configured to be coupled to and supported by the first and second brackets, respectively.

According to another embodiment, a multi-headrest mount for a vehicle includes an elongate crossbar having a length for defining a space between two adjacent headrests when mounted in the vehicle and first and second brackets disposed at opposing ends of the crossbar, the brackets being configured to receive posts of the two headrests. At least one of the crossbar, the first bracket, or the second bracket is configured to be mounted to a frame of the vehicle.

According to another embodiment, a seat for a vehicle includes a seat bottom and a seatback arrangement having a first portion that is pivotable relative to the seat bottom between a folded position and an upright position when the seat bottom and the first portion are mounted in the vehicle. The seatback arrangement further has a second portion that is mountable in the vehicle so that the second portion is aligned with the first portion and positioned proximate a top of the first portion opposite the seat bottom when the seat bottom and the seatback arrangement are mounted in the vehicle and the first portion is in the upright position. When the seatback arrangement is mounted in the vehicle, the first portion is pivotable relative to the second portion.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1A:
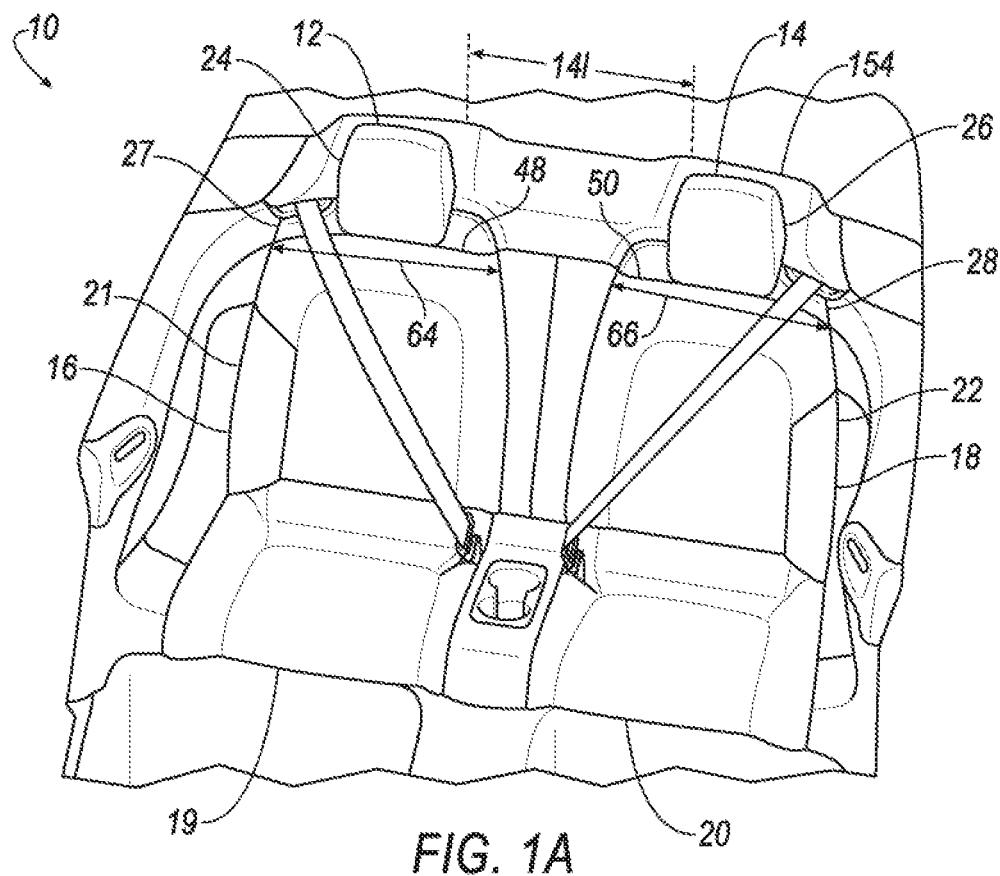
FIG. 1A is a fragmentary front perspective view of a vehicle having seats with lower seatback portions in an upright position in accordance with an embodiment of the instant disclosure.

FIG. 1A is a front perspective view of a vehicle 10 having seats 12, 14 with lower seatback portions 16, 18 that are each in an upright position in accordance with an embodiment of the instant disclosure. In the illustrated embodiment, the vehicle 10 is a convertible; however, the present disclosure may be implemented on other motor vehicles. Furthermore, in the illustrated embodiment, the seats 12, 14 are back-row seats. In other embodiments, the present disclosure may be implemented elsewhere within the vehicle 10 and/or in other seat configurations such as bench seats or in vehicles with more than two seats in a row. In the illustrated embodiment, the seats 12, 14 have seat bottoms 19, 20, seatback arrangements 21, 22 which include the seatback portions 16, 18, and headrests 24, 26. The seat bottoms 19, 20 may be mounted to the vehicle 10 such that the seat bottoms 19, 20 are disposed adjacent a floor of the vehicle 10. The seatback arrangements 21, 22 may be mounted to the vehicle 10 such that one end of the respective seatback arrangement 21, 22 is adjacent the corresponding seat bottom 19, 20.

Figure 1B:
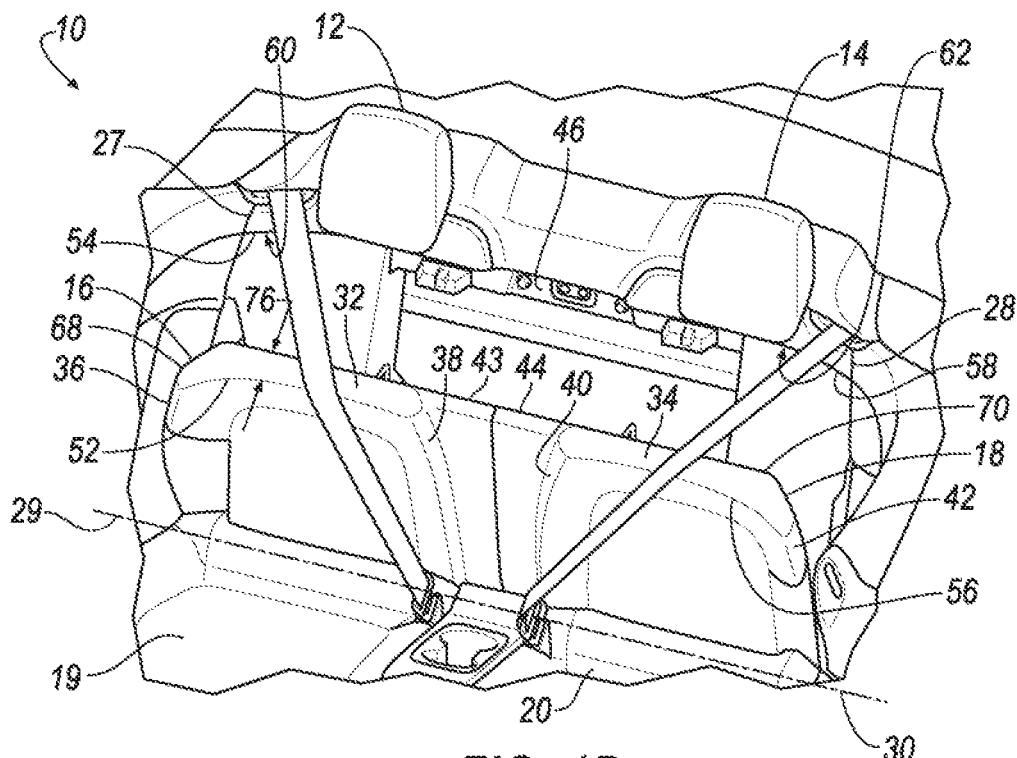
FIG. 1B is a fragmentary front perspective view of the vehicle of FIG. 1A with the lower seatback portions in a position between the upright position and a folded position.

FIG. 1B is a front perspective view of the vehicle 10 of FIG. 1A with each of the lower seatback portions 16, 18 in a position between the upright position and a folded position, in which the seatback portion 16, 18 may be positioned on or proximate a respective seat bottom 19, 20. The seatback arrangements 21, 22 may include the seatback portions 16, 18, which are pivotable in the illustrated embodiment, and seatback portions 27, 28 that are fixed in the illustrated embodiment. As such, seatback portions 16, 18 may be lower seatback portions, and seatback portions 27, 28 may be upper seatback portions. Seatback portions 16, 18 may be pivotable about pivot points or pivot axes (depicted as dashed lines 29, 30), respectively, that are adjacent the respective seat bottoms 19, 20 between the folded positions and the upright positions. In the illustrated embodiment, the seatback portions 16, 18 are pivotable independently of one another. In another embodiment, the seatback portions 16, 18 may be connected together so that they are pivotable together. Each of the seatback portions 16, 18 may have a top opposite the respective seat bottom 19, 20 with a top surface 32, 34. Each of the seatback portions 16, 18 may also have lateral sides 36, 38, 40, 42 extending from a bottom of the respective seatback portion 16, 18 adjacent the respective seat bottom 19, 20 to the top surface 32, 34. In the illustrated embodiment, the seatback portions 16, 18 have walls 43, 44 that extend inwardly from the respective lateral side 38, 40 toward the center of the vehicle 10 between the seats 12, 14. In another embodiment, the walls 43, 44 may be uncoupled from the seatback portions 16, 18 and mounted to a frame 46 of the vehicle 10 such that the walls 43, 44 are fixed and the seatback portions 16, 18 pivot independently of the walls 43, 44. In the illustrated embodiment, the walls 43, 44 are thinner than the lateral sides 38, 40. Adjacent the lateral sides 36, 38, 40, 42, the seatback portions 16, 18 may be curved for aesthetics and comfort.

Still referring to FIG. 1B, the seatback portions 27, 28 may form tops of the seatback arrangements 21, 22. The seatback portions 27, 28 may not be connected to (e.g., may be uncoupled from) the respective seatback portion 16, 18, such that the seatback portions 16, 18 are pivotable relative to the respective seatback portion 27, 28. In some embodiments, each seatback portion 16, 18 may be configured to be releasably connected or coupled to a respective seatback portion 27, 28 when the seatback portion 16, 18 is in the upright position. For example, each seatback portion 16, 18 may be configured to latch onto the respective seatback portion 27, 28 (e.g., with a movable latch) when the seatback portion 16, 18 is in the upright position, but be unlatched or uncoupled therefrom in order to pivot the seatback portion 16, 18 relative to the respective seatback portion 27, 28. Although the seatback portions 27, 28 are illustrated as being fixed, in some embodiments, each of the seatback portions 27, 28 may be movable relative to the respective seatback portion 16, 18.

Figure 2:
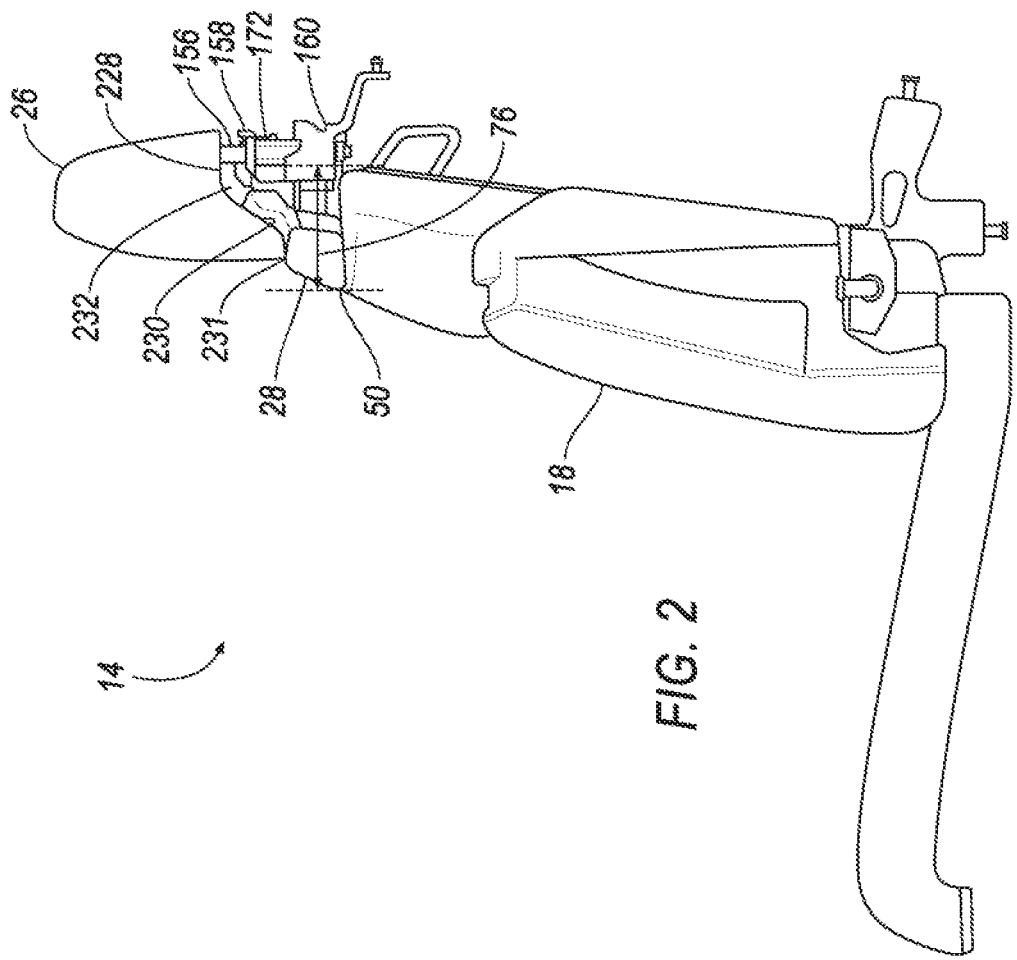
FIG. 2 is a side elevational view of the seat of FIG. 1A.

Each of the seatback portions 27, 28 may be mountable in the vehicle 10 to be positioned proximate the top of the respective seatback portion 16, 18 opposite the respective seat bottom 19, 20 when the seatback portion 27, 28 is mounted in the vehicle 10 and in the upright position, such that each seatback portion 27, 28 is aligned with the respective seatback portion 16, 18. Furthermore, each seatback portion 27, 28 may contact or abut the respective seatback portion 16, 18, or there may be a gap 48, 50 of less than 10 mm between the respective seatback portions 16, 18, 27, 28 when the seatback portions 16, 18 are in the upright positions. Having little to no gap 48, 50 between the seatback portions 16, 18, 27, 28 may be aesthetically pleasing and give the appearance of a non-segmented or continuous seatback arrangement 21, 22. In one embodiment, the gap 48, 50 may be measured between front edges 52, 54, 56, 58 of the respective seatback portions 16, 27, 18, 28. In one embodiment, the gap 48, 50 may be less than 5 mm. FIG. 2 is a side elevational view of the seat 14 of FIG. 1A. As shown, in the illustrated embodiment, there is a minimal gap 50 between the seatback portions 18, 28.

Referring to FIG. 1B, each of the seatback portions 27, 28 may have a bottom defining a bottom surface 60, 62 disposed proximate the respective seatback portion 16, 18 when mounted in the vehicle 10 and in the upright position. Each of the bottom surfaces 60, 62 may be configured to span a width 64, 66 (FIG. 1A) of the respective top of the seatback portion 16, 18 when mounted to the vehicle 10 and in the upright position. In the illustrated embodiment, the top surfaces 32, 34 of the seatback portions 16, 18 are positioned proximate the respective bottom surfaces 60, 62 of the seatback portions 27, 28 such that surface areas 68, 70 of the top surfaces 32, 34 are substantially the same as surface areas (depicted as reference numeral 72 in FIG. 4) of the respective bottom surfaces 60, 62. In the illustrated embodiment, a majority of each of the top surfaces 32, 34 contacts or abuts a majority of the respective bottom surface 60, 62 in the upright position. With reference to FIG. 2, each of the bottom surfaces 60, 62 may be configured to span a depth (depicted as reference numeral 76) of the respective top of the seatback portion 16, 18 when mounted to the vehicle 10 and the respective seatback portion 16, 18 is in the upright position.

Figure 3:
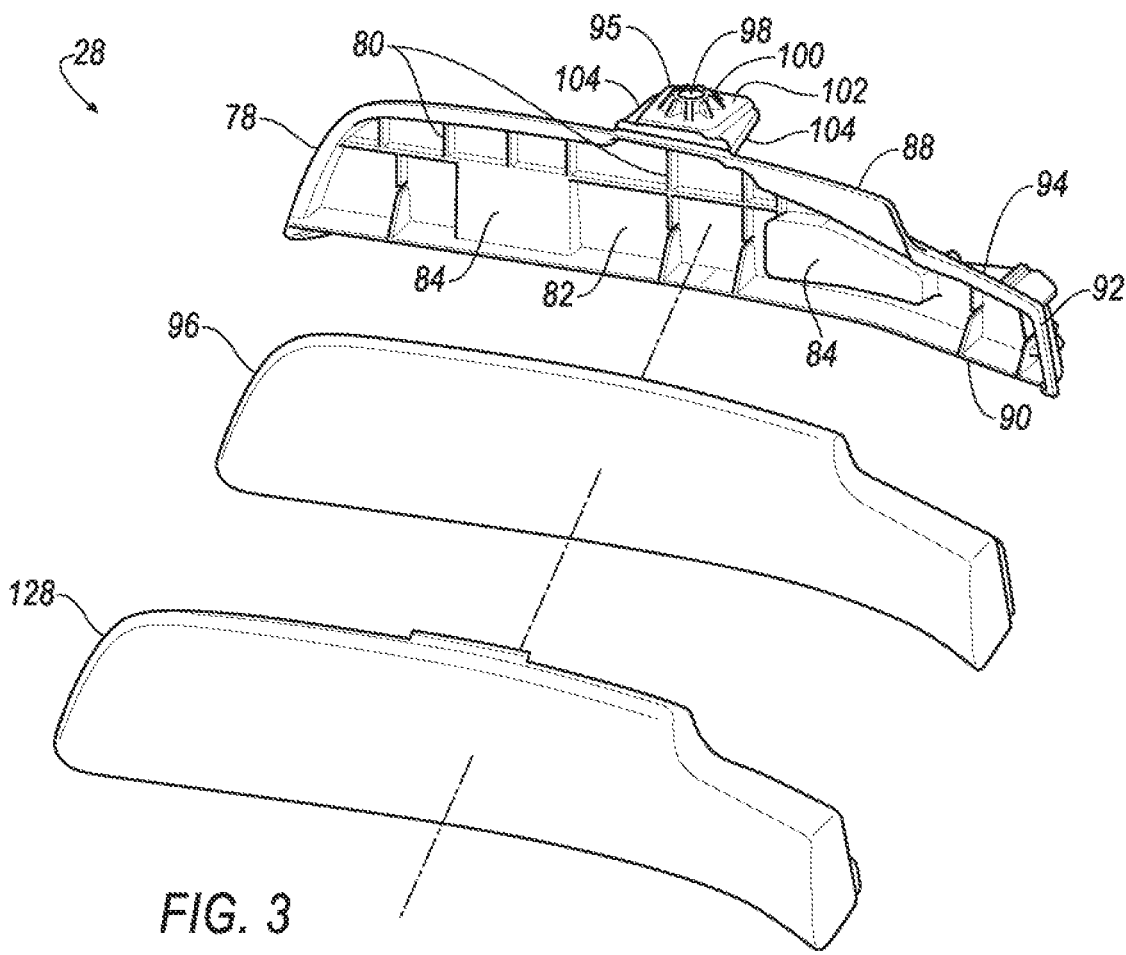
FIG. 3 is an exploded view of an upper seatback portion illustrated in FIG. 1A.
Figure 4:
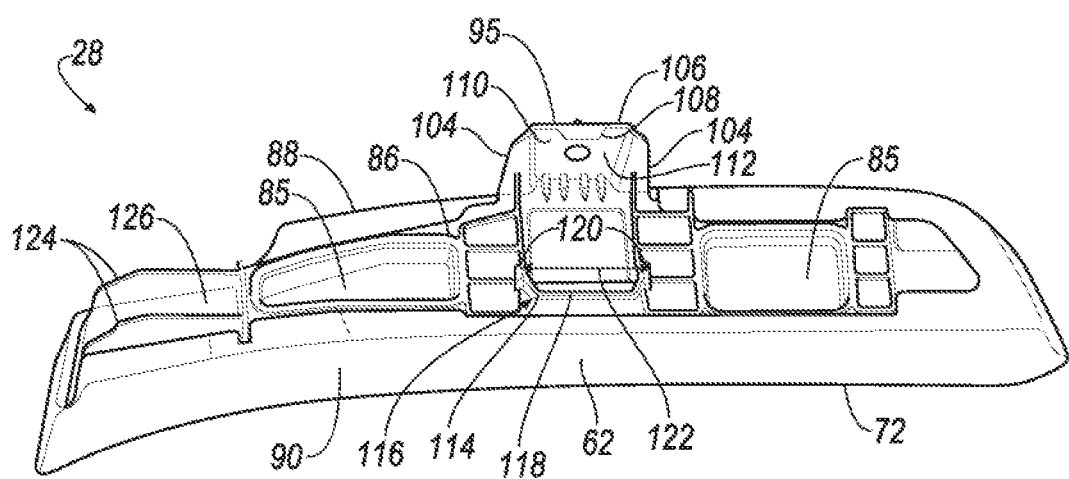
FIG. 4 is a rear perspective view of the upper seatback portion of FIG. 3.

FIG. 3 is an exploded view of the seatback portion 28 illustrated in FIG. 1A. FIG. 4 is a rear perspective view of the seatback portion 28 of FIG. 3. The following discussion may pertain to seatback portion 27 as well since seatback portions 27, 28 are mirror images of one another in the illustrated embodiment. As illustrated, the seatback portion 28 may include a substrate 78 forming a base of the seatback portion 28. The substrate 78 may include ribs 80 protruding away from a front side 82 of the substrate. The substrate 78 may also include protrusions 84 that correspond to recesses 85 (FIG. 4) formed in a rear side 86 of the seatback portion 28 opposite the front side 82 for reducing material and costs. The substrate 78 may have a top 88, a bottom 90 opposite the top 88, and a side 92 extending between the top 88 and bottom 90. The top 88 may define a slot 94 adjacent the side 92 to accommodate a seat belt (FIG. 1A) when mounted to the vehicle 10. The substrate 78 may be made of molded plastic, a combination of bended steel and plastic, or fiber-reinforced plastic in some embodiments.

Still referring to FIG. 3, the substrate 78 may further include a ledge 95 extending from the rear side 86 at the top 88 in a rearward direction away from a cushion 96 of the seatback portion 28. The ledge 95 may be used to mount the seatback portion 28 in the vehicle 10. In the illustrated embodiment, the ledge 95 is generally disposed midway between the sides of the seatback portion 28. The ledge 95 may be generally horizontally oriented when mounted in the vehicle 10 and include a thru-hole 98 at its center for receiving a bolt. The ledge 95 may include a bushing 100 disposed on a top surface 102 of the ledge 95 that defines the thru-hole 98. In the illustrated embodiment, the bushing 100 is shaped like a star to withstand applied torque. A metal insert may be included inside the bushing through which the bolt may be threaded. The ledge 95 may have lateral ends 104 that curve downwards toward the bottom 90 of the seatback portion 28 and away from the bushing 100. Referring to FIG. 4, a rear end 106 of the ledge 95 includes a tab 108 extending perpendicularly downward toward the bottom 90. The ledge 95 may define a cavity 110 formed in an underside 112 of the ledge 95 and defined by the lateral ends 104.

With reference to FIG. 4, the substrate 78 may further include a hook member 114 protruding from the rear side 86 of the substrate 78 and hooking downward to form a slot 116 between the hook member 114 and rear side 86. The hook member 114 may be used to mount the seatback portion 28 in the vehicle 10, as explained below in detail. In the illustrated embodiment, the hook member 114 is disposed directly below the ledge 95 between the top 88 and bottom 90. Between the rear side 86 of the substrate 78 and a tip 118 of the hook member 114, opposing lateral ends 120 of the hook member 114 may converge toward one another such that the hook member 114 has a width 122 that decreases toward the tip 118. The substrate 78 may further include two parallel plates 124 protruding from the rear side 86 adjacent the slot 94. The plates 124 may be generally horizontally oriented and define a cavity 126 therebetween. In one embodiment, the plates 124 may aid in stabilizing and supporting the seatback portion 28 when mounted in the vehicle 10 by being disposed adjacent to and/or abutting a portion of the frame 46 (FIG. 1B) of the vehicle 10.

Referring back to FIG. 3, the seatback portion 28 may further include the cushion 96 disposed on the front side 82. The cushion 96 may comprise a foam that is injection molded to the substrate. For example and without limitation, the substrate 78 may be inserted into one portion of the foam mold prior to injecting the foam to make the cushion 96. The ribs 80 in the substrate 78 may form an infrastructure for the cushion 96 and aid in forming the cushion 96 and adhering the cushion 96 to the substrate 78. In the illustrated embodiment, the cushion 96 spans across the entire front side 82 of the substrate 78. The cushion 96 may generally have the same outline as the substrate 78 in some embodiments.

Still referring to FIG. 3, the seatback portion 28 may further include a trim layer 128 that covers the cushion 96. For example and without limitation, the trim layer 128 may be inserted into another portion of the foam mold (opposite the substrate 78) prior to injecting the foam to make the cushion 96. To further secure the trim layer 128 to the substrate 78, the trim layer 128 may then be stapled to the rear side 86 (FIG. 4) of the substrate 78. In one embodiment, the trim layer 128 is coupled to the cushion 96 or the substrate 78 by adhesive and/or staples. The trim layer 128 may comprise leather, vinyl, or the like.

Figure 5:
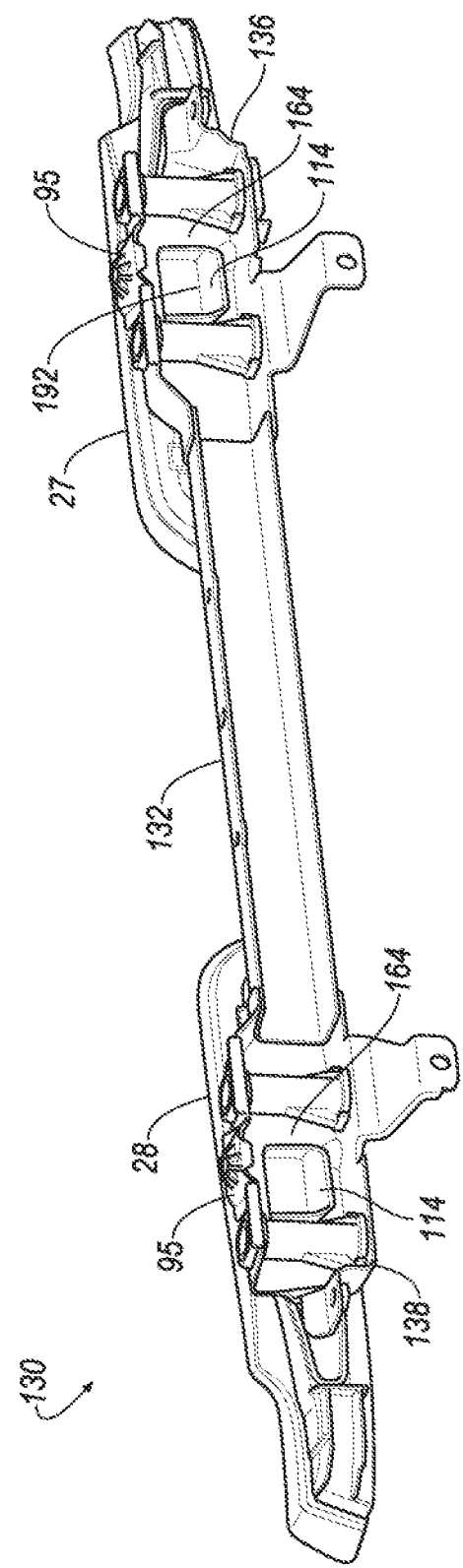
FIG. 5 is a rear perspective view of a multi-headrest assembly illustrated in FIG. 1A with the headrests removed.

FIG. 5 is a rear perspective view of a multi-headrest assembly 130 illustrated in FIG. 1A with the headrests 24, 26 removed. The assembly 130 may be mounted to the frame 46 (FIG. 1B) of the vehicle 10, such as a body-in-white portion of the vehicle 10 that traverses across the seats 12, 14 adjacent the headrests 24, 26. The assembly 130 may allow the headrests 24, 26 to be mounted indirectly to the frame 46. The assembly 130 may be uncoupled to the seatback portions 16, 18 such that each of the seatback portions 16, 18 may pivot relative to the respective seatback portion 27, 28.

Figure 6:
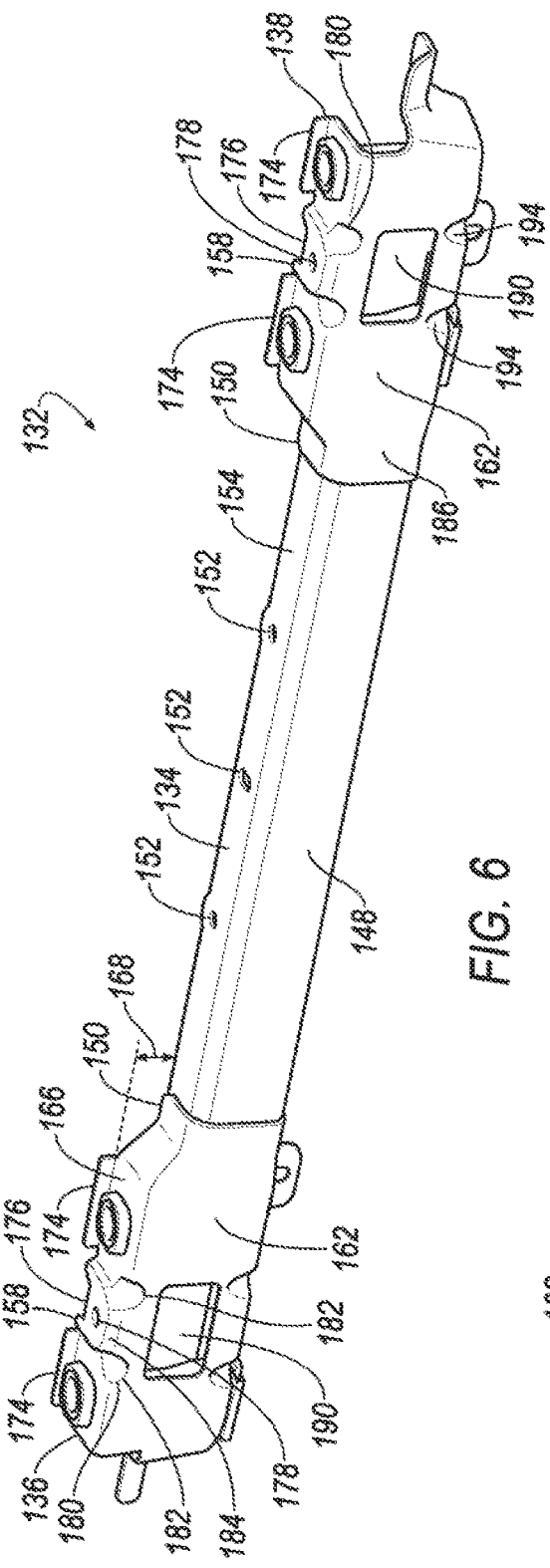
FIG. 6 is a front perspective view of a multi-headrest mount of the multi-headrest assembly illustrated in FIG. 5.
Figure 7:
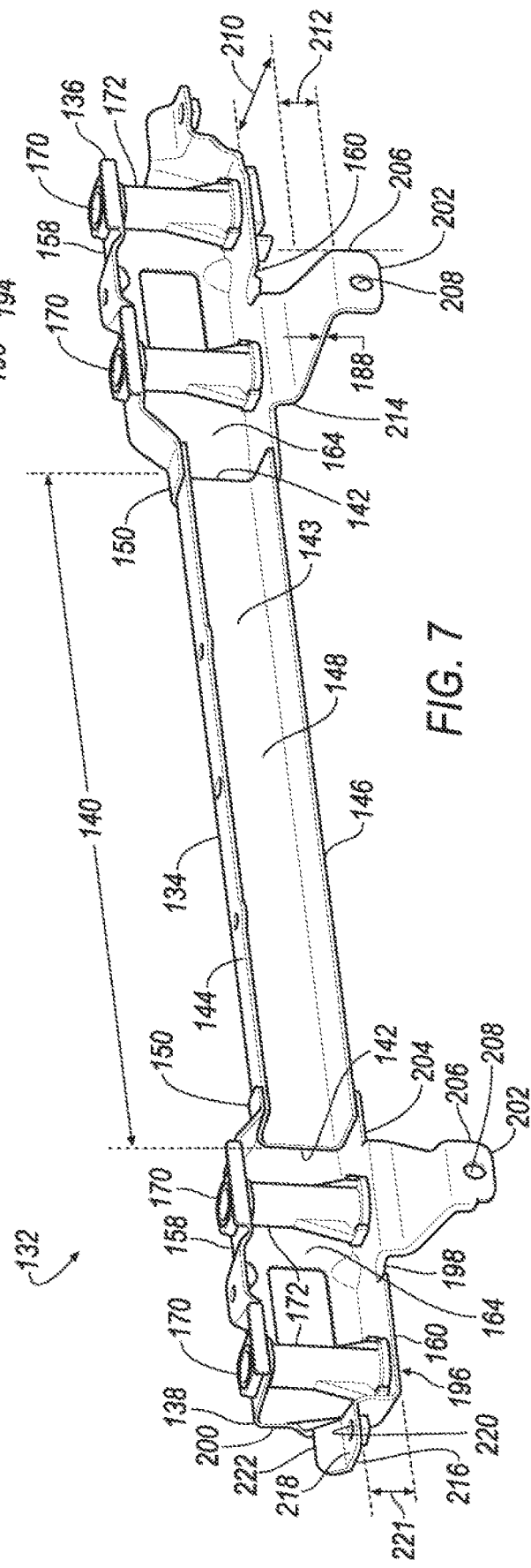
FIG. 7 is a rear perspective of the multi-headrest mount illustrated in FIG. 6.

The assembly 130 may include a multi-headrest mount 132, the seatback portions 27, 28, and the headrests 24, 26. FIG. 6 is a front perspective view of the multi-headrest mount 132, and FIG. 7 is a rear perspective of the multi-headrest mount 132. The multi-headrest mount 132 may be designed to absorb energy upon impact to decrease the energy absorbed by the frame 46 of the vehicle 10 (e.g., the body-in-white). Although the illustrated embodiment shows two headrests 24, 26 in the assembly 130, the assembly 130 may include more or less than two headrests in other embodiments.

With reference to FIGS. 6-7, in the illustrated embodiment, the multi-headrest mount 132 has an elongate crossbar 134 and brackets 136, 138 coupled to and spaced along the crossbar 134 for supporting the headrests 24, 26, respectively. The crossbar 134 may have a length 140 defining a space 141 (FIG. 1A) between two adjacent headrests 24, 26 for aligning the headrests 24, 26 with the pivotable seatback portions 16, 18 of the seats 12, 14, respectively. The crossbar 134 may couple the brackets 136, 138 together. In one embodiment, the brackets 136, 138 are disposed at opposing ends 142 of the crossbar 134. In other embodiments, the brackets 136, 138 may be disposed between the opposing ends 142. The crossbar 134 may be configured to be mounted to the frame 46 (FIG. 1B) of the vehicle 10. The crossbar 134 may be shaped to define a crossbar cavity 143 extending the length 140 of the crossbar 134. In the illustrated embodiment, the crossbar cavity 143 is a partial cavity with an open end facing a direction away from the seatback portions 27, 28.

A top flange 144 and a bottom flange 146 of the crossbar 134 may be disposed parallel to one another with a front member 148 disposed perpendicularly to and connecting the top and bottom flanges 144, 146. The crossbar 134 may take on other shapes and sizes than what is shown. For example and without limitation, the crossbar 134 may be a hollow cylindrical tube or be L-shaped and only include the front member 148 and top flange 144. In the illustrated embodiment, the opposing ends 142 of the crossbar 134 are nested and overlapped by ends 150 of the brackets 136, 138 and welded together. However, one of ordinary skill in the art will understand that there are several ways to couple the crossbar 134 with brackets 136, 138. For example and without limitation, the opposing ends 142 of the crossbar 134 may nest and overlap the ends 150 of the brackets 136, 138 or abut the ends 150 of the brackets 136, 138 and not overlap. Furthermore, the crossbar 134 and brackets 136, 138 may be constructed as one integral piece in accordance with other embodiments. The crossbar 134 may further include holes 152 through the top flange 144 for receiving bolts used to mount the crossbar 134 to the frame 46 and/or to couple a cover plate 154 (FIG. 1A) to the crossbar 134. In the illustrated embodiment, there are three holes 152; however, more or less may be utilized, and the holes 152 may be disposed elsewhere on the crossbar 134. In some embodiments, the crossbar 134 is not directly coupled to the frame 46 or cover plate 154.

Referring to FIGS. 6-7, the brackets 136, 138 may be configured to support and receive posts 156 (FIG. 2) of the headrests 24, 26, respectively, such that the headrests 24, 26 may be selectively mounted to the respective brackets 136, 138. The brackets 136, 138 may also be configured to support the seatback portions 27, 28, with the seatback portions 27, 28 being mounted to the respective bracket 136, 138. Additionally, the brackets 136, 138 may be configured to be mounted to the frame 46 (FIG. 1B) of the vehicle 10. The brackets 136, 138 may be appropriately spaced along the crossbar 134 to align the headrests 24, 26 with the pivotable seatback portions 16, 18.

Still referring to FIGS. 6-7, each of the brackets 136, 138 may have a top flange 158, a bottom flange 160 disposed opposite the top flange 158, and a front member 162 coupling the top and bottom flanges 158, 160 to define a cavity 164 for receiving posts 156 (FIG. 2) of the respective headrest 24, 26. The top and bottom flanges 158, 160 may protrude perpendicularly from opposing ends of the respective front member 162 with the top and bottom flanges 158, 160 being spaced from one another to define the cavity 164. In the illustrated embodiment, the brackets 136, 138 and crossbar 134 have the same general overall shape with each component defining a partial cavity. In other embodiments, the brackets 136, 138 and crossbar 134 may be dissimilar in size and/or shape.

Referring to FIG. 6, a top surface 166 of the top flange 158 may be generally parallel with and be disposed a distance 168 from the top flange 144 of the crossbar 134, such that the top flange of the bracket 136, 138 curves downward toward the top flange 144 of the crossbar 134 at the end 150 of the bracket 136, 138. In other embodiments, the top flanges 158 of the brackets 136, 138 are disposed at the same height as or below the top flange 144 of the crossbar 134. The top flange 158 further includes two circular apertures 170 for receiving sleeves 172 through which the posts 156 (FIG. 2) of the respective headrest 24, 26 extend. As such, the apertures 170 may be appropriately spaced to accommodate the spacing of the posts 156. Adjacent each sleeve 172 and disposed opposite the front member 162, the top flange 158 may include a lip 174 for stiffening the top flange 158. The top flange 158 may also include a mounting platform 176 to which the respective seatback portion 27, 28 may be mounted. At the center of the mounting platform 176 may be an aperture 178 for receiving a bolt used to couple the seatback portion 27, 28 to the respective bracket 136, 138. Adjacent the front member 162, the top flange 158 may include a recessed portion 180 for accommodating the underside 112 of the ledge (FIG. 4) of the respective seatback portion 27, 28. In the illustrated embodiment, the recessed portions 180 define two generally round depressions 182 disposed at front corners of the mounting platform 176 and a groove 184 extending between the depressions 182 along an edge at which the front member and top flange meet. Opposite the recessed portion 180, the mounting platform 176 may be slotted to receive the tab 108 (FIG. 4) of the respective seatback portion 27, 28.

Still referring to FIG. 6, a front surface 186 of the front member 162 of the bracket 136, 138 adjacent the respective seatback portion 27, 28 may be generally parallel with the front member 148 of the crossbar 134. In the illustrated embodiment, front surfaces of the front members 162 of the brackets 136, 138 and crossbar 134 are offset from one another by a thickness 188 of the front members 162 of the brackets 136, 138. Although in the illustrated embodiment, the brackets 136, 138 and crossbar 134 have the same thickness 188, the thicknesses 188 of the brackets 136, 138 and crossbar 134 may be non-uniform in other embodiments. An aperture 190 is defined by and extends through the front member 162 for receiving the hook member 114 of the respective seatback portion 27, 28. As shown in FIG. 5, the hook member 114 of the seatback portion 27, 28 may be configured to extend through the aperture 190 of the respective front member 162 such that the hook member 114 is disposed within the cavity 164 of the respective bracket 136, 138 when coupled thereto. In the illustrated embodiment, the aperture 190 is rectangular to accommodate the shape of the hook member 114. Furthermore, a bottom of the aperture 190 opposite the top flange 158 of the bracket 136, 138 is appropriately spaced from the mounting platform 176 on the top flange 158 to accommodate the spatial positioning of the ledge 95 of the seatback portion 27, 28 relative to a base 192 of the hook member 114 that is disposed adjacent the bottom of the aperture 190 when coupled thereto. Referring to FIG. 6, adjacent the bottom of the aperture 190 are two divots 194. In the illustrated embodiment, the divots 194 are semicircular and are formed along an edge at which the front member 162 and bottom flange 160 meet. The divots 194 may aid in stiffening this edge.

Referring to FIGS. 6-7, a bottom surface 196 of the bottom flange 160 opposite the cavity 164 may be generally parallel with the bottom flange 146 of the crossbar 134. In the illustrated embodiment, bottom surfaces 196 of the bottom flanges 160 and crossbar 134 are offset from one another by the thickness 188 of the bottom flanges 160 of the brackets 136, 138. The bottom flange 160 may further include two circular apertures axially aligned with the respective apertures 170 of the top flange 158 for receiving ends of the sleeves 172. In one embodiment, the ends of the headrest posts 156 may be disposed within the sleeves 172. The posts 156 may extend through the sleeves 172 and into another component disposed below the bottom flange 160. The bottom flange 160 may further include a slot 198 formed in a rear edge opposite the front member 162 to aid in manufacturing. The slot 198 may be generally semicircular in shape and be disposed at a center of the bottom flange 160 that is aligned with the aperture 178 in the mounting platform 176 of the top flange 158. Adjacent the slot 198 and disposed opposite a lateral end 200 of a main portion of the respective bracket 136, 138 may be a rear wing 202 for mounting the bracket 136, 138 to the frame 46 of the vehicle 10. The rear wing 202 may protrude from the rear edge 204 of the bottom flange 160 of the respective bracket 136, 138.

With reference to FIG. 7, the rear wing 202 may be formed to define a mounting platform 206 through which an aperture 208 extends for receiving a fastener, such as a bolt. In the illustrated embodiment, the mounting platform 206, which may be disposed perpendicularly relative to the mounting platform 176 of the top flange 158, is spaced a distance 210 from the rear edge 204 of the bottom flange 160 and is disposed at a height 212 below the bottom flange 160. A base 214 of the rear wing 202 may be wider than the mounting platform 206 of the rear wing 202 in some embodiments. The aperture 208 may be positioned a distance from the sleeve 172 that is adjacent the crossbar 134. In the illustrated embodiment, the aperture 208 is positioned inward of the mounting platform 176 of the respective top flange 158.

With continued reference to FIG. 7, each of the brackets 136, 138 may include a side wing 216 extending away from the crossbar 134 in opposing axial directions relative to the crossbar 134 to define mounting platforms 218, which may be disposed generally parallel to the mounting platform 176 of the top flange 158. Each of the side wings 216 may extend from the lateral end 200 of the main portion of the respective bracket 136, 138 opposite the crossbar 134. The mounting platforms 218 each include an aperture 220 for receiving a bolt used to couple the bracket 136, 138 to the frame 46 of the vehicle 10. In the illustrated embodiment, each of the side wings 216 extends from the front member 162 and bottom flange 160 of the respective bracket 136, 138 and converges to define the respective mounting platform 218. The side wings 216 may be designed to position the mounting platforms 218 at a desired height relative to the bottom flange 160, for example. In the illustrated embodiment, each of the mounting platforms 218 is disposed at a height 221 between a top and bottom of the respective side wing 216, and each of the side wings 216 includes a flap 222 extending from the respective mounting platform 218 toward the respective top flange 158. One of ordinary skill in the art will understand that there are multiple ways to shape and design the side wings 216 to define the mounting platforms 218, depending on the specific application and vehicle, as well as the desired load requirements thereof. For example and without limitation, the side wings 216 may extend from the top flange 158 and front member 162. Furthermore, in the illustrated embodiment, the mounting platforms 218 are disposed between the respective front member 162 and rear edge 204 such that the mounting platforms 218 are axially aligned with the cavity 164 of the respective bracket 136, 138. Additionally, the mounting platforms 218 may be disposed at a height between the top and bottom flanges 158, 160 of the brackets 136, 138. The apertures 178, 220 formed in the mounting platforms 176, 218 of the respective bracket 136, 138 may be aligned in an axial direction relative to the crossbar 134 in some embodiments to facilitate mounting to the frame 46 of the vehicle 10.

Figure 8:
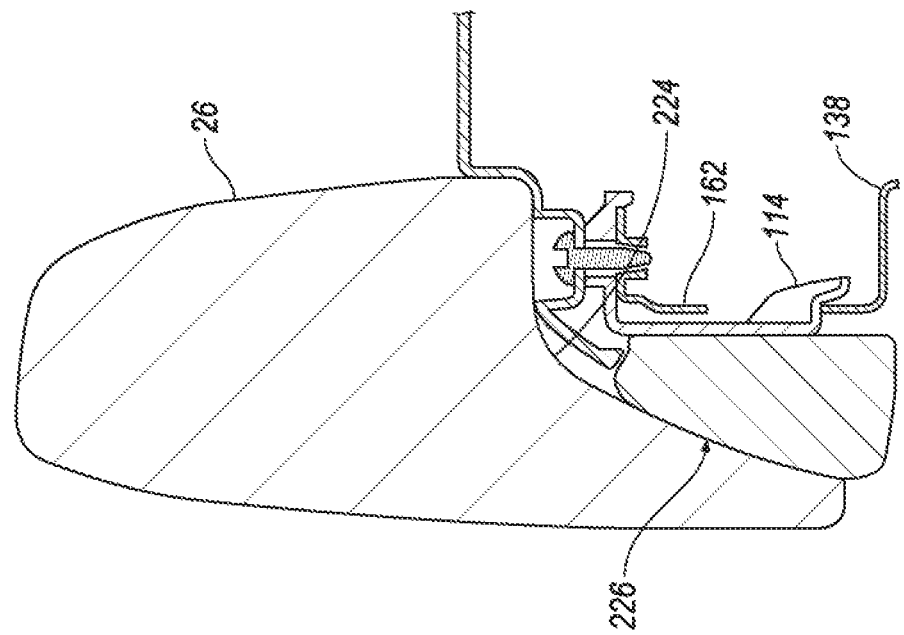
FIG. 8 is a side cross-sectional view of the multi-headrest assembly illustrated in FIG. 1A.

FIG. 8 is a side cross-sectional view of the multi-headrest assembly 130 illustrated in FIG. 1A. As shown, the seatback portions 27, 28 may be configured to be coupled to the top flange 158 and adjacent the front member 162 of the respective bracket 136, 138. Furthermore, the headrests 24, 26 may include a bottom 224 that is shaped to accommodate the respective seatback portion 27, 28 such that the bottom 224 of the headrest 24, 26 extends downward and over a front surface 226 of the respective seatback portion 27, 28. As shown in FIG. 2, the posts 156 of the headrests 24, 26 may extend from a rear portion 228 of the respective bottom 224 and into the respective sleeves 172 that extend between the top and bottom flanges 158, 160 of the respective bracket 136, 138. In the illustrated embodiment, the rear portion 228 of the headrest 24, 26 is disposed opposite a front portion 230 of the respective headrest 24, 26 that overlaps the front surface 226 of the respective seatback portion 27, 28. The rear portion 228 may be spaced a distance away from a front 231 of the headrest 24, 26 to define a partial cavity 232. A portion of the seatback portion 27, 28 and a portion of the bracket 136, 138 may be disposed within the respective partial cavity 232.

With the above configuration, the multi-headrest assembly 130 may absorb energy upon impact to decrease the energy absorbed by the frame 46 of the vehicle 10 (e.g., the body-in-white). Furthermore, the alignment of the headrests 24, 26 relative to each other may be employed through the assembly 130 rather than directly on the frame 46. In addition, to accommodate small space in the rear passenger cabin, a portion of the seatback arrangement 21, 22 (i.e., pivotable seatback portions 16, 18) may be pivotable relative to the respective seat bottom 19, 20 between folded and upright positions, while the other portion of the seatback arrangement 21, 22 (i.e., upper seatback portions 27, 28) and headrest 24, 26 may remain fixed in the upright and folded positions.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A multi-headrest assembly for a vehicle, comprising:
first and second headrests for first and second seats of the vehicle, respectively;
a multi-headrest mount having a crossbar and first and second brackets coupled to and spaced along the crossbar for supporting the first and second headrests, respectively, wherein the crossbar has a length for defining a space between the first and second headrests to align the first and second headrests with the first and second seats, respectively, when mounted in the vehicle; and
first and second seatback portions configured to be coupled to and supported by the first and second brackets, respectively;
wherein each of the first and second headrests extends downward and over a front surface of a respective seatback portion when the first and second headrests and the first and second seatback portions are coupled to the multi-headrest mount.

2. The multi-headrest assembly of claim 1, wherein each of the first and second headrests has posts extending from a bottom of the respective headrest, and each of the first and second brackets defines a cavity for receiving ends of the respective posts.

3. The multi-headrest assembly of claim 2, wherein each of the bottoms of the first and second headrests extends downward and over the front surface of the respective seatback portion when the first and second headrests and first and second seatback portions are coupled to the multi-headrest mount.

4. The multi-headrest assembly of claim 3, wherein each of the first and second brackets has a top flange, a bottom flange disposed opposite the top flange, and a front member coupling the top and bottom flanges to define the respective cavity.

5. The multi-headrest assembly of claim 4, further comprising sleeves for receiving the posts of the first and second headrests, wherein the sleeves extend between the top and bottom flanges of the first and second brackets.

6. The multi-headrest assembly of claim 4, wherein each of the first and second seatback portions is configured to be coupled to the top flange of the respective bracket.

7. The multi-headrest assembly of claim 6, wherein each of the first and second seatback portions includes a hook member that is configured to extend through an aperture defined by the front member of the respective bracket such that each of the hook members is disposed within the cavity of the respective bracket when the first and second seatback portions are coupled to the first and second brackets, respectively.

8. The multi-headrest assembly of claim 1, wherein the first and second brackets have first and second side wings, respectively, extending away from the crossbar in opposing axial directions relative to the crossbar to define horizontal mounting platforms.

9. A multi-headrest mount for a vehicle, comprising:
an elongate crossbar having a length for defining a space between two adjacent headrests when mounted in the vehicle;
first and second brackets disposed at opposing ends of the crossbar, the brackets being configured to receive posts of the two headrests, wherein each of the first and second brackets has a front member and top and bottom flanges protruding from the front member, the top and bottom flanges being spaced from one another to define a cavity for receiving a headrest post;
wherein at least one of the crossbar, the first bracket, or the second bracket is configured to be mounted to a frame of the vehicle.

10. The multi-headrest mount of claim 9, wherein the first and second brackets have first and second side wings, respectively, extending from a lateral end of the respective bracket opposite the elongate crossbar in opposing axial directions relative to the elongate crossbar.

11. The multi-headrest mount of claim 10, wherein each of the first and second side wings extends from the front member and bottom flange of the respective bracket and converges to define a mounting platform disposed at a height between the respective top and bottom flanges.

12. The multi-headrest mount of claim 9, wherein the first and second brackets have first and second rear wings, respectively, protruding from a rear edge of the bottom flange opposite the front member of the respective bracket.

13. The multi-headrest mount of claim 9, wherein the elongate crossbar is shaped to define a crossbar cavity extending the length of the crossbar.

14. A seat for a vehicle, comprising:
a seat bottom;
a seatback arrangement having:
a first portion that is pivotable relative to the seat bottom between a folded position and an upright position when the seat bottom and the first portion are mounted in the vehicle; and a second portion that is mountable in the vehicle so that the second portion is aligned with the first portion and positioned proximate a top of the first portion opposite the seat bottom when the seat bottom and the seatback arrangement are mounted in the vehicle and the first portion is in the upright position, wherein, when the seatback arrangement is mounted in the vehicle, the first portion is pivotable relative to the second portion; and a headrest mountable in the vehicle so that the headrest extends downward and over a front surface of the second portion of the seatback arrangement when the seatback arrangement is mounted in the vehicle.

15. The seat of claim 14, wherein a bottom of the second portion is configured to span a width of the top of the first portion when the first and second portions are mounted in the vehicle and the first portion is in the upright position.

16. The seat of claim 14, wherein the first portion has a top surface positioned proximate a bottom surface of the second portion when the first and second portions are mounted in the vehicle and the first portion is in the upright position, and wherein a first surface area of the top surface is substantially the same as a second surface area of the bottom surface.

17. The seat of claim 14, wherein the second portion includes a substrate and a cushion disposed on a front side of the substrate, and wherein the substrate has a ledge extending from a rear side of the substrate opposite the front side in a rearward direction away from the cushion.

18. The seat of claim 17, wherein the substrate has a hook member protruding from the rear side of the substrate and hooking downward to form a slot between the hook member and rear side of the substrate.

19. The seat of claim 14, wherein the first and second portions are aligned with a gap less than 10 mm between the first and second portions when the seatback arrangement is mounted in the vehicle and the first portion is in the upright position.

20. The seat of claim 14 further comprising a headrest mount on which the headrest and the second portion of the seatback arrangement are mountable.

* * * * *